June 6, 1967  E. A. GLASSEY  3,323,368
U-TUBE SERVOED MANOMETER
Filed April 26, 1965  2 Sheets-Sheet 1
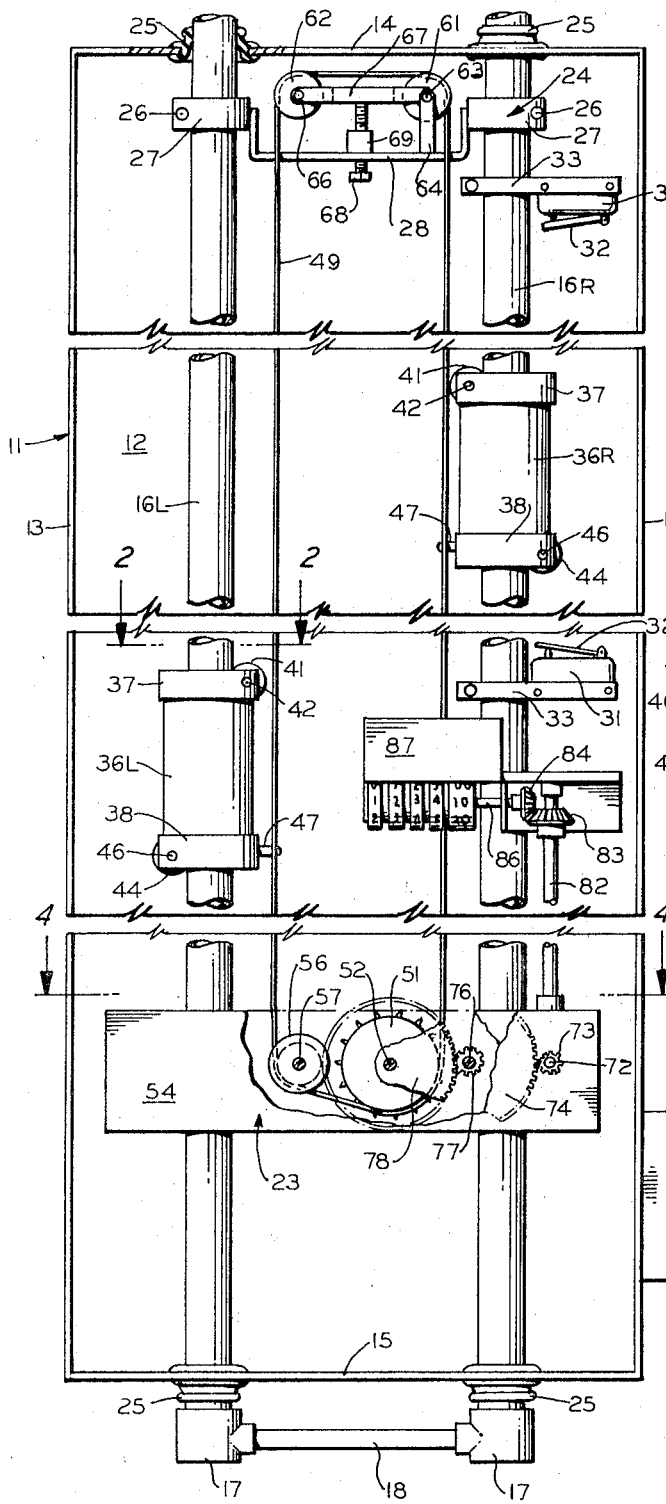
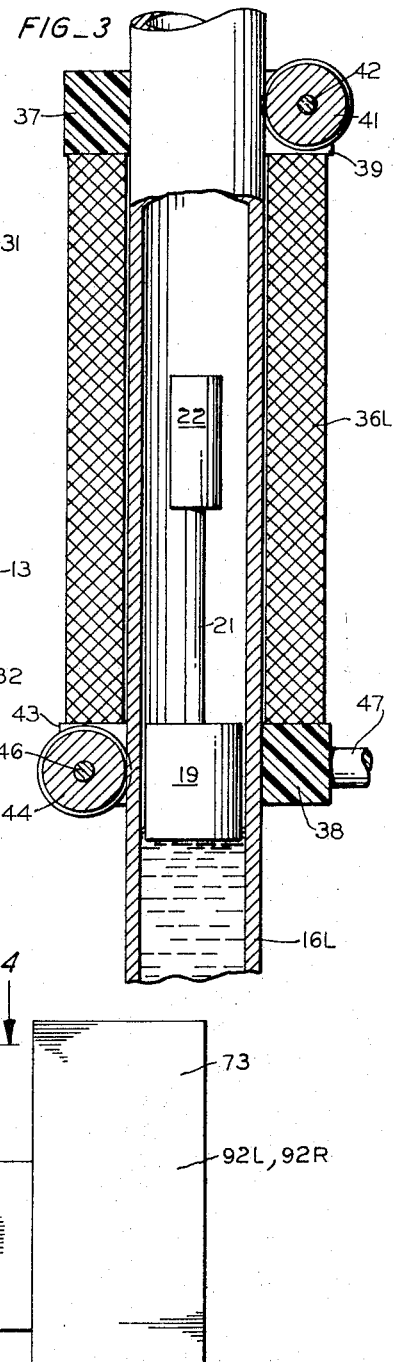
INVENTOR.
EUGENE A. GLASSEY
BY
Julian Caplan
ATTORNEY June 6, 1967 E. A. GLASSEY 3,323,368
U-TUBE SERVOED MANOMETER
Filed April 26, 1965 2 Sheets-Sheet 2
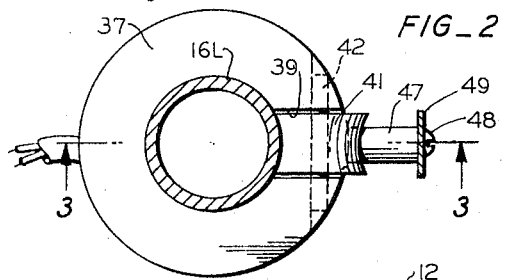
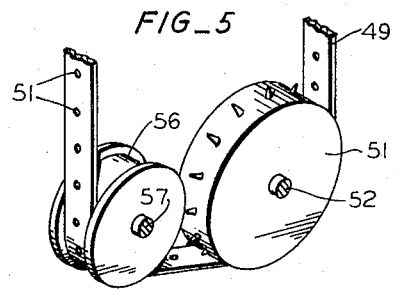
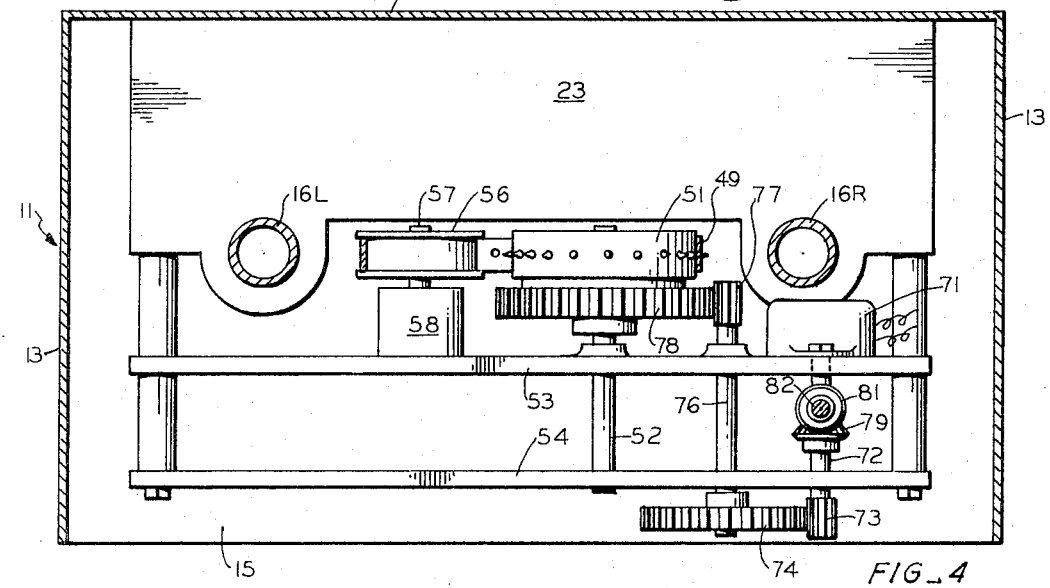
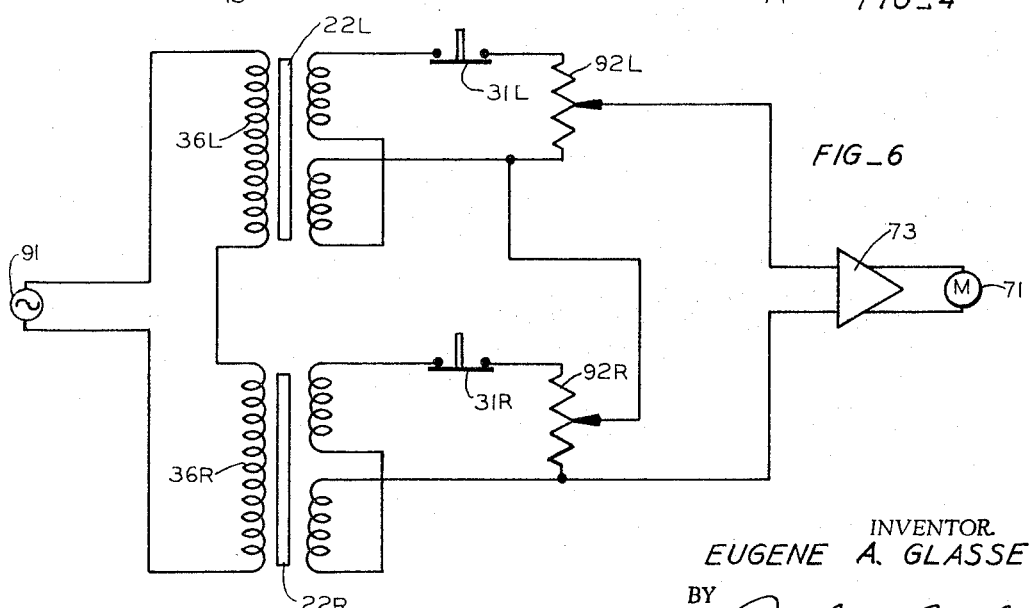
INVENTOR.
EUGENE A. GLASSEY
BY Julian Caplan
ATTORNEY United States Patent Office 3,323,368
Patented June 6, 1967

3,323,368
U-TUBE SERVOED MANOMETER
Eugene A. Glassey, Los Altos, Calif., assignor to Exactel Instrument Company, Mountain View, Calif.
Filed Apr. 26, 1965, Ser. No. 450,897
8 Claims. (Cl. 73—401)

This invention relates to a new and improved U-tube type servoed manometer. More particularly, the invention relates to a modification or improvement in the type of manometer shown in Patent No. 3,043,144. In accordance with the present invention, two parallel tubes are used each containing a liquid such as mercury and each provided with a float supporting an armature for a differential transformer. Means including a servo-motor is provided for driving the differential transformers so that they are electrically-centered or substantially electrically-centered relative to their armatures and an indicator is provided to indicate the relative positions of the floats.

It will be understood that although the tubes used in the apparatus are of high quality, nevertheless inherently variations in internal diameter will occur and these variations affect the accuracy of the reading of the indicator. An important feature of the present invention is the fact that two tubes are used and two differential transformers, which differential transformers are fixed to a tape a distance apart which is not variable. Accordingly, an averaging of any inaccuracies in the diameter of one of the tubes is attained which eliminates error of this type. Accordingly, it is a further principal purpose of the present invention to eliminate inaccuracies attributable to minor variations in tube structure.

A further feature of the invention is the use of tubes which are relatively strong such as stainless steel or Lucite, such tubes serving as guides for the differential transformers. Clamps are provided near the top and the bottom of each tube which hold the tubes in parallel alignment and thus provide a rigid structure comprising the two tubes and the two clamps. The clamps also provide guides for the pulleys and drive sprocket around which the perforated tape connected to the differential transformers is directed.

These clamps also provide means for attachment to a supporting structure such as a wall, pedestal or pole.

The tape drive mechanism is an important feature of the present invention. There are provided two idler pulleys at the top of the travel of the differential transformers and one idler pulley and one drive sprocket at the bottom, the drive sprocket being driven through a gear train by the servo motor. The drive sprocket operates at a 2 to 1 ratio with respect to the indicator or counter and thus sums the basic movements for both legs of the manometer. Similarly, small corrections in compensations as registered by one leg are doubled. The two differential transformers, therefore, are linked at a fixed distance apart along the tape and thus move together. A further feature of the invention is the provision of means to adjust the tension on the tape, as hereinafter described in greater detail.

Still another feature of the invention is the support of the differential transformers on the tubes. The transformers are provided with sleeve bearings at either end. A roller is mounted in each bearing, the rollers being diametrically opposed to each other. The tape is attached to one of the bearings on the side opposite the rollers supported by such bearing. Since the tape is under tension the transformers are, for practical purposes, supported between the two rollers in a manner which is substantially free of frictional resistance to movement.

Other objects of the present invention will become apparent upon reading the following specification and referring to the accompanying drawings in which similar characters of reference represent corresponding parts in each of the several views.

In the drawings:
FIG. 1 is a front elevational view of the device broken away in section to conserve space and to reveal internal construction.
FIG. 2 is an enlarged sectional view taken substantially along the line 2—2 of FIG. 1.
FIG. 3 is a sectional view taken substantially along the line 3—3 of FIG. 2.
FIG. 4 is a sectional view taken substantially along the line 4—4 of FIG. 1.
FIG. 5 is a fragmentary perspective view of a portion of the tape, bottom idler pulley and drive sprocket.
FIG. 6 is a schematic wiring diagram.

The manometer which is the subject of the present invention is mounted in a cabinet 11 having a back 12, sides 13, top 14, and bottom 15. As is best shown in FIG. 1, portions of the tubes which are hereinafter described, project through top 14 and bottom 15. A front cover (not shown) may also be provided.

Mounted substantially within cabinet 11 but projecting outside at top and bottom are tubes 16L, 16R, which are preferably strong enough to mount the elements hereinafter described. For such purpose stainless steel tubes are particularly suitable although Lucite or even glass may be substituted. The tubes are provided with fittings 17 at the bottom interconnected by a pipe 18. At the top, the tubes are also provided with fittings (not shown) each tube being subject to a different pressure such as atmospheric pressure. It will be understood that the tubes 16L, 16R, are of accurate construction, but inherent in the manufacture thereof are minor variations in the inside diameter which affect the location of the tops of the liquid columns. The averaging of the readings hereinafter described is intended to compensate for such variation in construction. The tubes are partially filled with a liquid such as mercury as is best shown in FIG. 3, and each tube is provided with a float 19 having an upward projecting stem 21 supporting a magnetic material armature 22.

Tubes 16L, 16R, are held in precise parallel alignment by means of top clamp 24. Bottom clamp 23 is a rigid member through which the tubes 16L, 16R, extend with clearance, but the tubes are clamped to top clamp 23 by screws 26 so that the tubes are suspended therefrom. Member 23 may be secured to a wall, pedestal or pipe, or otherwise supported so that tubes 16L, 16R are precisely vertical. Seals 25 at top and bottom make casing 11 weathertight. Bottom bracket 23 also provides a mounting for the sprocket and servo motor all as hereinafter described in detail.

Top bracket 24 comprises clamp sleeves 27 each encompassing one of the tubes and having a downward directed yoke 28 interconnecting element 27 in a rigid structure.

Also mounted on at least one of the tubes such as 16R is a limit switch 31 having a switch arm 32 and connected the tube 16R and held thereon by means of bracket 33. There are two such limit switches 31, one at the top and one at the bottom. The function of the limit switch is hereinafter described.

Tube 16L carries differential transformer 36L and tube 16R carries differential transformer 36R. The windings of such differential transformers form no part of the present invention and are well understood in this art. Such windings are supported by top and bottom collars 37, 38. Top collar 37 is formed with a radial slot 39 supporting a grooved roller 41 which is rotatively mounted on shaft 42. The curvature of roller 41 is complementary to the outside diameter of tube 16L. Bottom collar 38 has a similar slot 43, grooved roller 44, and shaft 46. It will be noted that rollers 44 and 41 are diametrically opposed to each other relative to the axis of tube 16L. Attached to collar 38 directly opposite roller 44 is a pin 47. Pin 47 is attached by means of screw 48 to perforated metal tape 49. Tape 49 is formed with accurately spaced holes 51. As is apparent from FIG. 1, the two differential transformers 36L, 36R are each fixed to continuous tape 49 a fixed distance apart.

Tape 49 is driven by a sprocket 51 mounted on shaft 52 journalled in plates 53, 54, attached to bracket 23. An idler pulley 56 also receives tape 49, pulley 56 being mounted on shaft 57 which is journalled in a bearing 58 on plate 53. At the top of cabinet 11 are idler pulleys 61, 62. Pulley 61 is mounted on shaft 63 on upward extension 64 of yoke 28. Shaft 66 of pulley 62 is mounted on lever 67 which is pivotally mounted by shaft 63. A tension adjusting screw 68 is threaded into boss 69 on yoke 28. By adjustment of screw 68 the tension on tape 49 may be adjusted. It will be understood that tape 49 being of metal has considerable elasticity and thus biasses differential transformers 36L, 36R, so that the rollers 41, 44, provide the principal support of said transformers relative to the tubes 16L, 16R respectively.

Tape 49 is driven by means of a servo motor 71 mounted on support 23 and having a shaft 72 journalled in plates 53, 54, carrying a pinion 73 which drives a gear 74 on countershaft 76 which is likewise journalled in plates 53, 54. Shaft 76 carries a pinion 77 meshing with gear 78 on shaft 52 for sprocket 51. Hence a considerable speed reduction is achieved by the gear train.

Shaft 72 also carries a bevel gear 79 meshing with gear 81 on vertical shaft 82. The upper end of shaft 82 carries a set of bevel gears 83, 84, driving shaft 86 of counter 87 which is positioned so that it can be conveniently read. Counter 87 gives a visual indication of the position of tape 49.

The circuit diagram is shown in FIG. 6. A source of alternating current 91 energizes the primary coils of both differential transformers 36L, 36R. The secondary coils of the differential transformers are wound in series as is conventional in this component and are connetced through switches 31 to potentiometers 92L, 92R, which are used to match the two transformers. The outputs of the transformers are connected into amplifier 93 which energizes servo motor 71.

The foregoing construction and circuit may further be modified by the use of an analog temperature compensator such as is illustrated and described in Patent No. 3,043,144. Such modification will readily be understood by one skilled in this art upon reading the specification of the cited patent.

In theory, if the bores were precisely equal, ignoring temperature variations, the conditions for balance would be for both the differential transformers to be electrically centered relative to their armatures or, more generally, for the left and right differential transformers to be offset equidistantly in opposite directions. However, where there are variations in tube bore, the two differential transformers, being interconnected a fixed distance apart, balance with their armatures slightly off electrical center, and thus the errors in tube diameters are automatically balanced. Drive sprocket 51 operates at a 2 to 1 ratio with respect to indicator 87 so as to sum the basic movements for both legs of the manometer. Similarly, small corrections in compensations as registered are doubled.

The effect of the circuit shown in FIG. 6 is that motor 71 is energized in one direction or the other until the transformers 36L, 36R, are electrically balanced in their outputs or, in other words, that the armatures 22L, 22R, are equally and oppositely positioned offset relative to the electrical centers of their respective differential transformers.

What is claimed is:

1. An averaging manometer comprising a pair of parallel, rigid tubes each containing liquid, an armature in each said tube movable along said tube dependent on liquid level in said tube, a differential transformer on each said tube, first means mounting said transformers for sliding movement along said tubes, said transformers having secondary coils excited dependent on the relative positions of said armatures within said tubes relative to the electrical centers of said transformers, mechanical means for moving said transformers equal distances in opposite directions along said tubes, a servomotor driving said mechanical means, and an electrical circuit including said secondary coils controlling energization of said servomotor to drive said transformers.

2. A manometer according to claim 1, in which said mechanical means comprises a flexible continuous tape fixed to each said transformer and guide means supporting said tape with two stretches each parallel and in close proximity to one said tube.

3. A manometer according to claim 2, in which said guide means comprises a clamp fixed to each of said tubes adjacent their upper ends and having a pair of pulleys over which said tape passes, one said pulley being adjustable in position to adjust the tension on said tape.

4. A manometer according to claim 2, in which said guide means comprises a first clamp fixed to each of said tubes adjacent their upper ends and a second clamp adjacent the lower ends of said tubes, and a system of pulleys and a drive sprocket entirely supported by said clamps.

5. A manometer according to claim 4, which further comprises means for adjusting the position of one said pulley relative to the clamp on which it is supported to adjust the tension of said tape.

6. A manometer according to claim 1, in which said first means comprises a first roller rotatably mounted on one end of one said transformer bearing against one said tube, a second roller rotatably mounted on the end of said transformer opposite said first roller and on the side of said tube opposite said first roller and means biasing said transformer in a direction to force both said rollers against said tube.

7. A manometer according to claim 6, in which said last mentioned means comprises a metallic tape under tension, said tape comprising part of said mechanical means.

8. A manometer according to claim 6, in which said rollers are grooved complementary to the outside diameter of said tube, said rollers having axes of rotation parallel to each other and transverse to the longitudinal axis of said tube.

No references cited.

LOUIS R. PRINCE, *Primary Examiner.*

D. O. WOODIEL, *Assistant Examiner.*